(No Model.)
A. T. BROWN.
SYSTEM FOR ELECTRICAL COMMUNICATION.
No. 606,620.    Patented June 28, 1898.
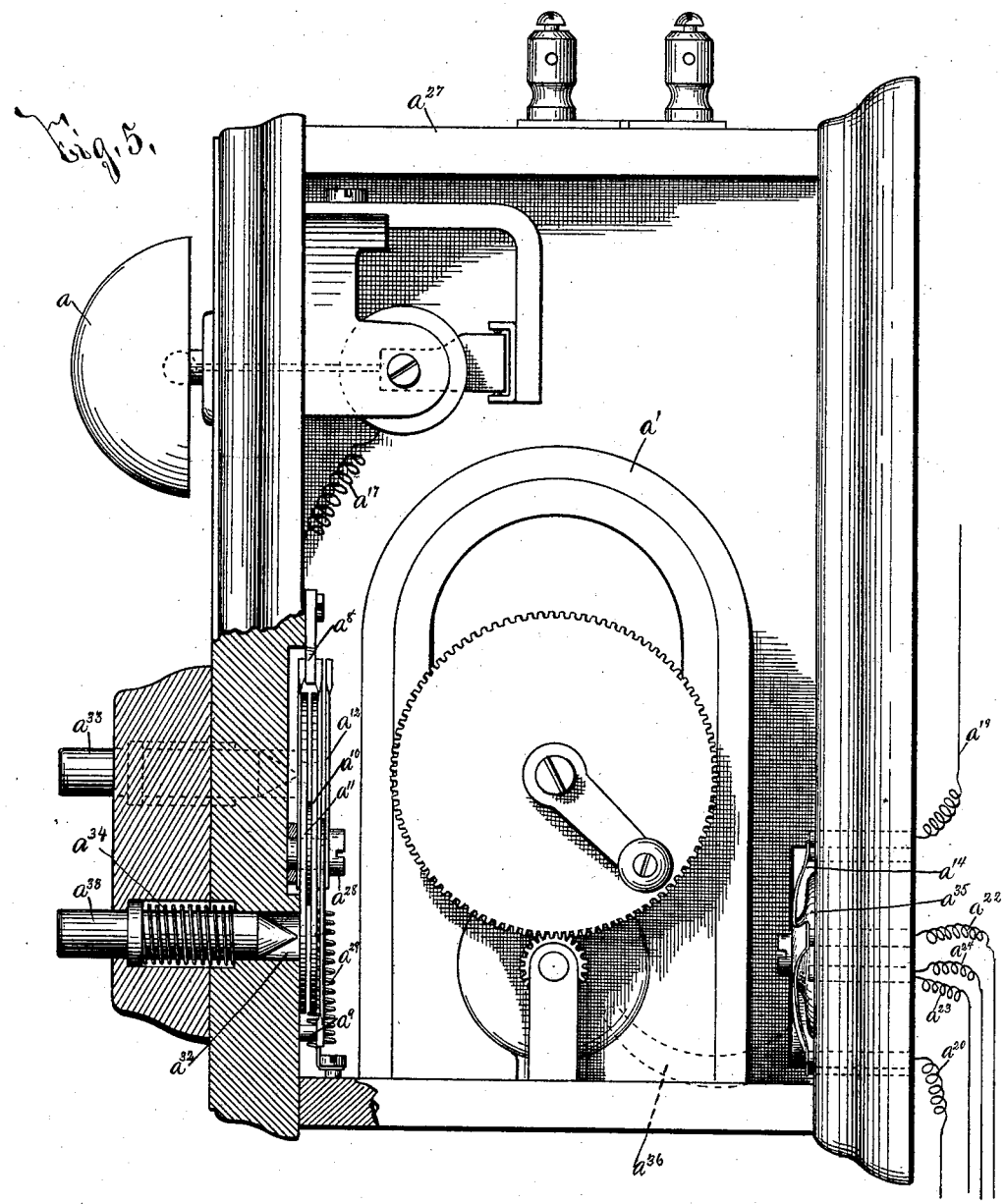
WITNESSES:
H. A. Carhart
W. E. Chase,
INVENTOR
Alexander T. Brown,
BY
Hey & Parsons,
ATTORNEYS.

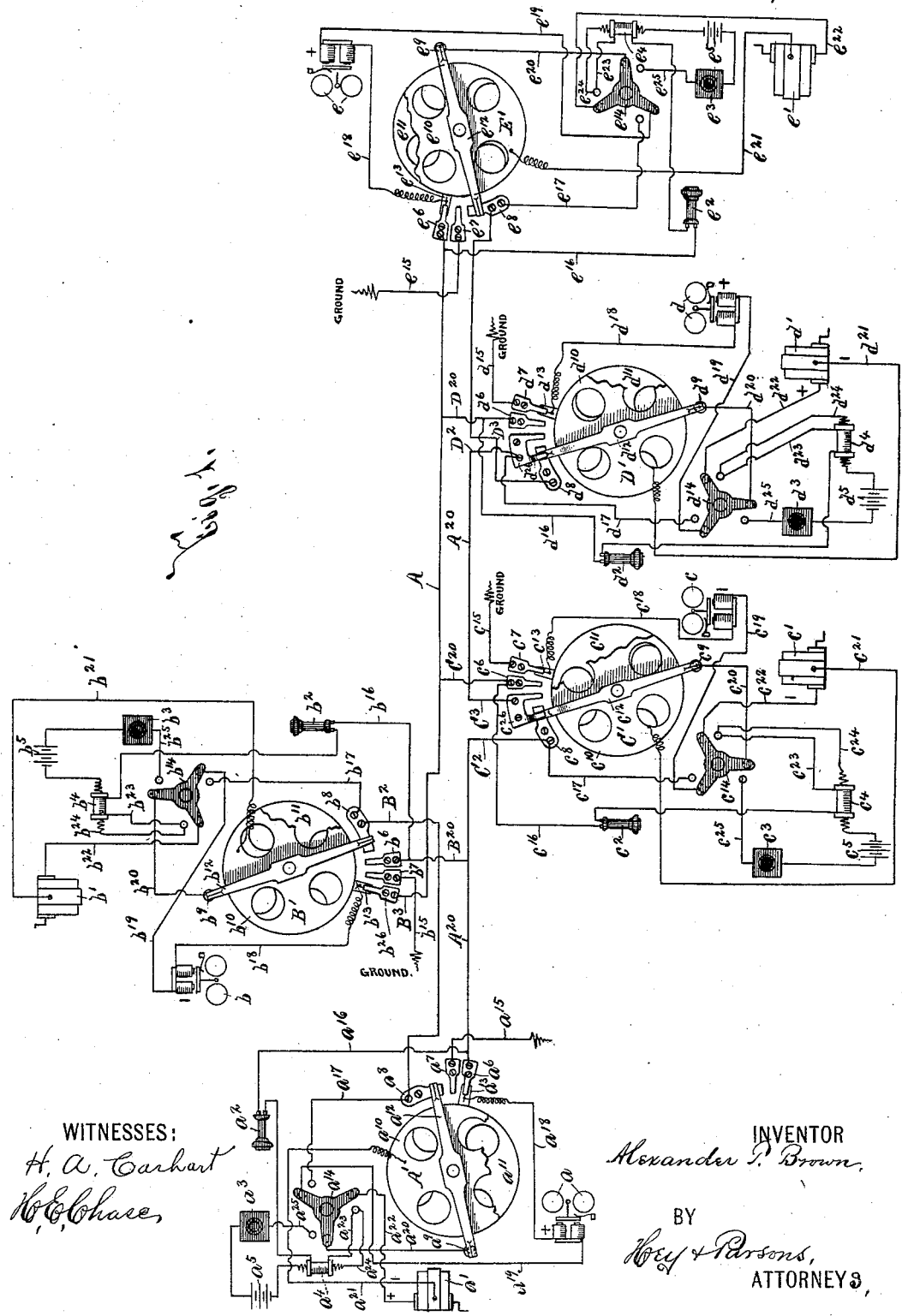

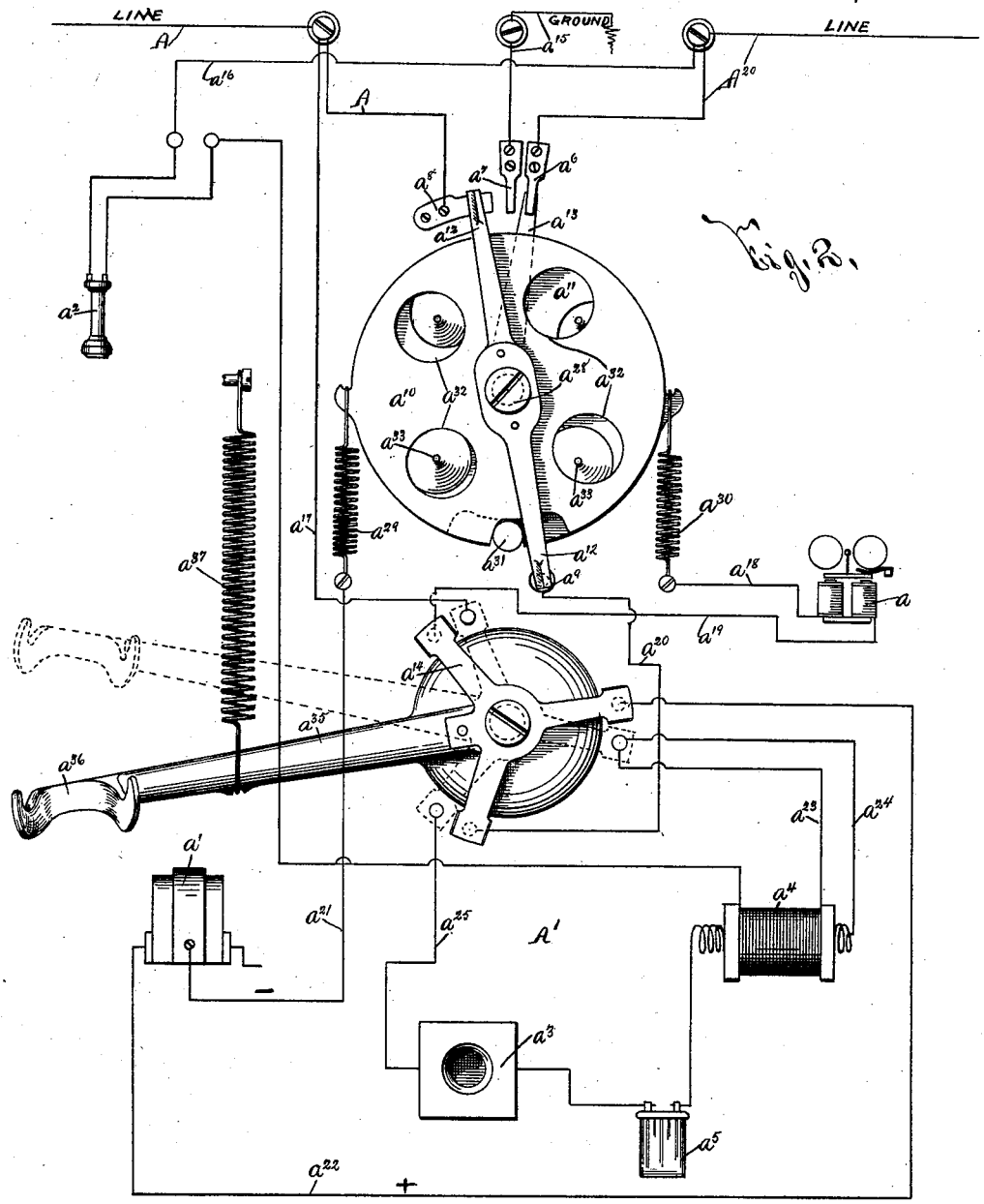

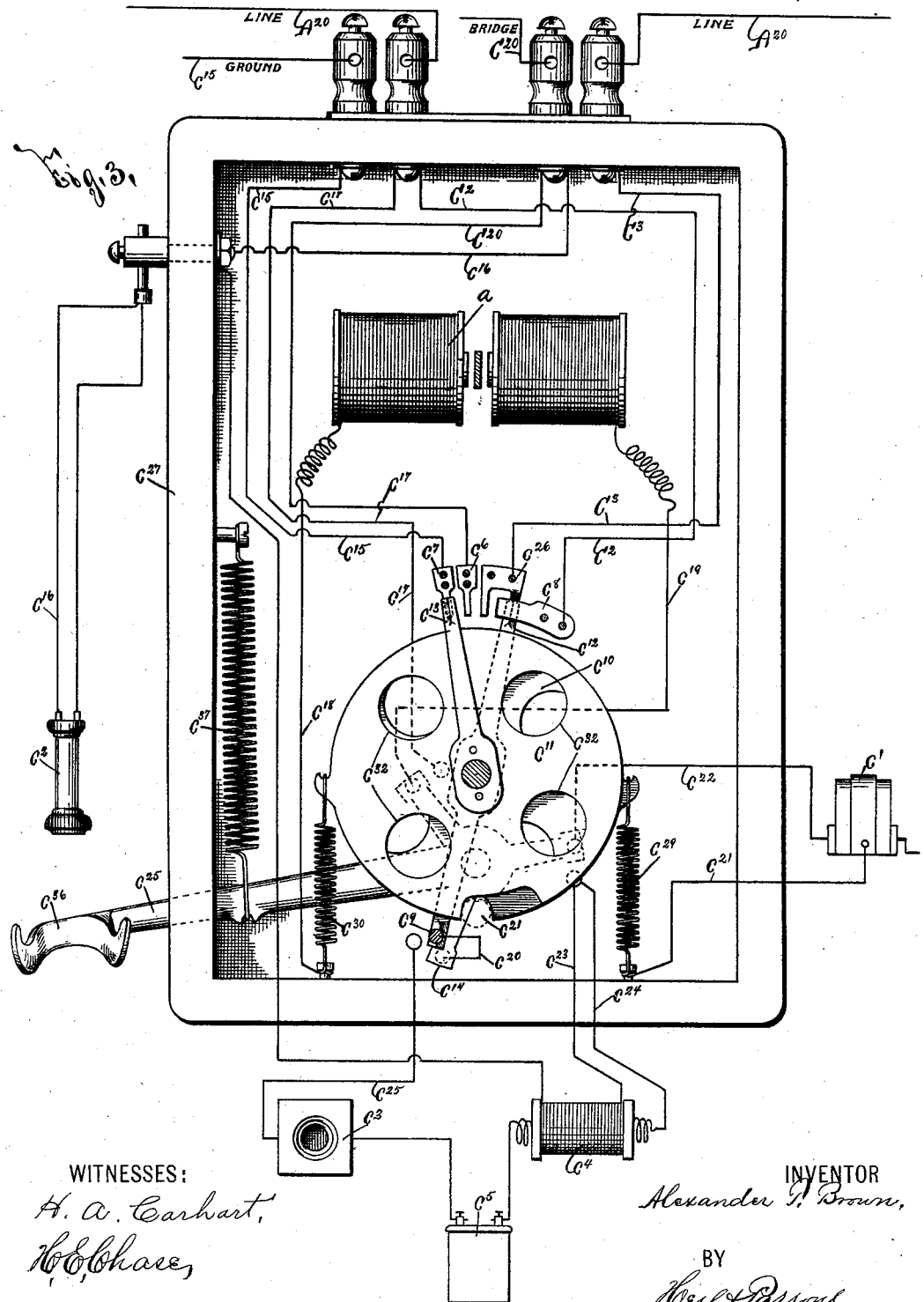

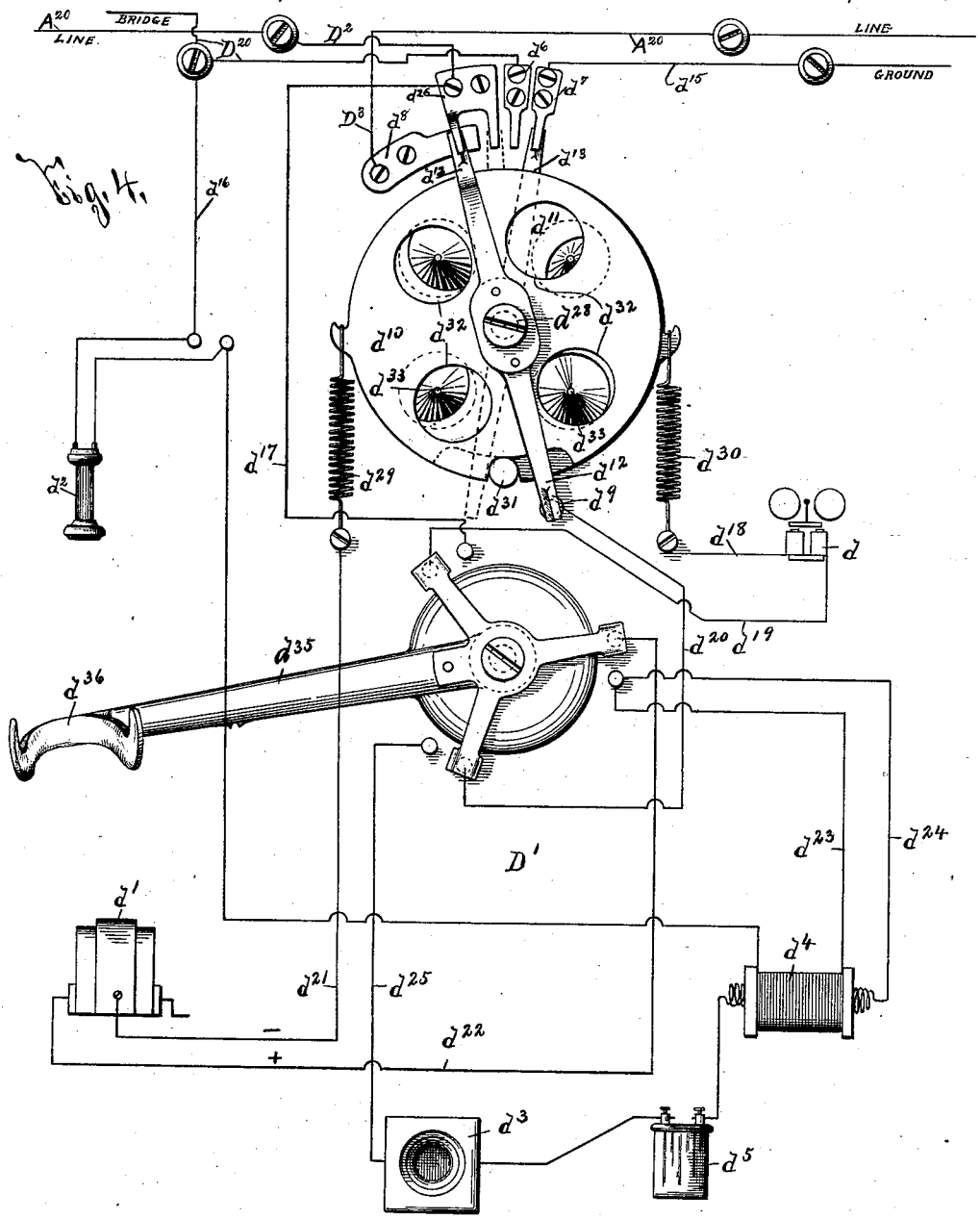

UNITED STATES PATENT OFFICE.

ALEXANDER T. BROWN, OF SYRACUSE, NEW YORK, ASSIGNOR TO WILBERT L. SMITH, TRUSTEE.

SYSTEM FOR ELECTRICAL COMMUNICATION.

SPECIFICATION forming part of Letters Patent No. 606,620, dated June 28, 1898.

Application filed April 9, 1896. Serial No. 586,763. (No model.)

*To all whom it may concern:*

Be it known that I, ALEXANDER T. BROWN, of Syracuse, in the county of Onondaga, in the State of New York, have invented new and useful Improvements in Systems for Electrical Communication, of which the following, taken in connection with the accompanying drawings, is a full, clear, and exact description.

My invention relates to an improved system of electrical communication for use in telephony, telegraphy, &c., and has for its object the production of a simplified construction of switching devices and arrangement of wiring whereby any one of several stations upon the same circuit may be signaled from one or more of the stations connected to said circuit; and to this end the invention consists, essentially, in the combination, construction, and arrangement of the component parts of the system, all as hereinafter more particularly described, and pointed out in the claims.

In describing this invention reference is had to the accompanying drawings, forming a part of this specification, in which like letters indicate corresponding parts in all the views.

Figure 1 is a diagrammatic view illustrating the general construction and arrangement of my improved system. Fig. 2 is a diagrammatic view of detached parts of one of the end stations of my system, the switching device being shown of substantially full size and in its normal position. Fig. 3 is a front elevation of a portion of the inclosing case or box ordinarily used for a magneto-electric machine, the switching device for one of the intermediate stations of my system is illustrated as operatively arranged in said case or box, and the other parts of said station shown diagrammatically and in reduced scale. Fig. 4 is a diagrammatic view of detached parts of another of the intermediate stations of this improved system, the switching device being shown of substantially full size and in its normal position; and Fig. 5 is a side elevation, partly in section and partly broken away, of the switching device seen at Fig. 2 and an inclosing case or box similar to the one shown at Fig. 3.

A $A^{20}$, Fig. 1, represent the line wires or conductors of a metallic circuit, $B^2$ $B^3$ $B^{20}$, $C^2$ $C^3$ $C^{20}$, $D^2$ $D^3$ $D^{20}$ branch conductors leading from the line conductors, and A' B' C' D' E' stations connected to said line and branch conductors. The station A' is preferably arranged at one end of the line conductors A $A^{20}$ and is provided with a responsive device or signal $a$, a source of electrical energy, as a magneto-electric machine $a'$, an electric communicating device, and a switching device, all of which parts may be of any desirable form, size, and construction. The electric communicating device usually consists of a receiver $a^2$, a transmitter $a^3$, an induction-coil $a^4$, and a battery $a^5$, and the switching device preferably consists of fixed terminals $a^6$ $a^7$ $a^8$ $a^9$, movable switch members $a^{10}$ $a^{11}$, provided with movable terminals $a^{12}$ $a^{13}$, a movable switch member $a^{14}$, and terminals (not lettered) engaged by said member $a^{14}$.

The line conductors A $A^{20}$ terminate, respectively, at the fixed terminals $a^8$ $a^6$, and conductors $a^{15}$ $a^{16}$ $a^{17}$ lead, respectively, from the terminal $a^7$, the line conductor $A^{20}$, and the terminal $a^8$ to the ground, the receiver $a^2$ and a terminal adapted to be engaged by the switch member $a^{14}$ and normally disconnected therefrom. The signal $a$ is connected in circuit with a conductor $a^{18}$, leading to the movable terminal $a^{13}$ and a conductor $a^{19}$. The switch member $a^{14}$ normally engages terminals forming the terminations of the conductor $a^{19}$ and an additional conductor $a^{20}$, leading to the terminal $a^9$, which is normally engaged by the movable terminal $a^{12}$.

The magneto-electric machine $a'$ is preferably designed to furnish an interrupted current and is connected in circuit with conductors $a^{21}$ $a^{22}$, leading, respectively, to the movable switch member $a^{10}$ and a terminal normally engaged by the movable switch member $a^{14}$. The secondary and primary windings of the induction-coil $a^4$ are suitably connected to the receiver $a^2$, a conductor $a^{23}$, the battery $a^5$, and a conductor $a^{24}$, and the transmitter $a^3$ is connected to said battery and to a conductor $a^{25}$. The conductors $a^{23}$ $a^{24}$ $a^{25}$ terminate at terminals which are adapted to be engaged by the movable switch member $a^{14}$ and are normally disconnected therefrom for breaking the circuits to the induction-coil.

The described means of connecting the parts of the switching and electric communicating and switching devices for the station A' is particularly simple and applicable for my improved system of electric communication; but it will be understood that said devices may be otherwise connected, if desired, providing the operation of the parts is not impaired. It will also be understood that the electric communicating device may consist merely of a telephone-receiver or any other suitable mechanism.

The stations B' C' D' E' are respectively provided with responsive devices or signals $b\ c\ d\ e$, magneto-electric machines $b'\ c'\ d'\ e'$, receivers $b^2\ c^2\ d^2\ e^2$, transmitters $b^3\ c^3\ d^3\ e^3$, induction-coils $b^4\ c^4\ d^4\ e^4$, batteries $b^5\ c^5\ d^5\ e^5$, terminals $b^6\ b^7\ b^8\ b^9\ b^{12}\ b^{13}$, $c^6\ c^7\ c^8\ c^9\ c^{12}\ c^{13}$, $d^6\ d^7\ d^8\ d^9\ d^{12}\ d^{13}$, $e^6\ e^7\ e^8\ e^9\ e^{12}\ e^{13}$, movable switch members $b^{10}\ b^{11}\ b^{14}$, $c^{10}\ c^{11}\ c^{14}$, $d^{10}\ d^{11}\ d^{14}$, $e^{10}\ e^{11}\ e^{14}$, and conductors $b^{15}\ b^{16}\ b^{17}\ b^{18}\ b^{19}\ b^{20}\ b^{21}\ b^{22}\ b^{23}\ b^{24}\ b^{25}$, $c^{15}\ c^{16}\ c^{17}\ c^{18}\ c^{19}\ c^{20}\ c^{21}\ c^{22}\ c^{23}\ c^{24}\ c^{25}$, $d^{15}\ d^{16}\ d^{17}\ d^{18}\ d^{19}\ d^{20}\ d^{21}\ d^{22}\ d^{23}\ d^{24}\ d^{25}$, and $e^{15}\ e^{16}\ e^{17}\ e^{18}\ e^{19}\ e^{20}\ e^{21}\ e^{22}\ e^{23}\ e^{24}\ e^{25}$, constructed and connected similarly to the like parts $a\ a'\ a^2\ a^3\ a^4\ a^5\ a^6\ a^7\ a^8\ a^9\ a^{12}\ a^{13}\ a^{10}\ a^{11}\ a^{14}\ a^{15}\ a^{16}\ a^{17}\ a^{18}\ a^{19}\ a^{20}\ a^{21}\ a^{22}\ a^{23}\ a^{24}\ a^{25}$ of the station A', with the exception of the arrangement of the terminals $b^6\ b^7\ b^8$, $c^6\ c^7\ c^8$, $d^6\ d^7\ d^8$, $e^6\ e^7\ e^8$, and the signals $b\ c\ d\ e$.

The terminals $e^6\ e^8$ are respectively connected to the line conductors A A$^{20}$, and at each station B' C' D' said line conductors are divided into opposite sections. The terminals $b^6\ c^6\ e^6$ are connected to the branch conductors B$^{20}$ C$^{20}$ D$^{20}$, the terminals $b^8\ c^8$ are respectively connected to sections of the line conductors A A$^{20}$, leading to the station A', and the terminal $d^8$ is connected to a section of the line conductor A$^{20}$, leading to the station E'. The remaining sections of said line conductors A A$^{20}$ are connected to additional fixed terminals $b^{26}\ c^{26}\ d^{26}$, two of which, $c^{26}\ d^{26}$, are formed with two engaging arms. These additional terminals $b^{26}\ c^{26}\ d^{26}$ are normally engaged with the movable terminals $b^{13}\ c^{12}\ d^{12}$, and the terminal $d^{26}$ is connected to one end of the conductor $d^{17}$. The signal $a$ is preferably operated only by a current of positive polarity and the signals $b\ c$ are operated only by currents of opposite polarity to those for operating the signals $d\ e$. I have therefore shown the signals $b\ c$ as negative and the signals $d\ e$ as positive, and it will be understood that suitable springs or any other well-known means as counterweights, not necessary to describe herein, are connected to the hammers or movable parts of said signals for retracting the same.

The movable switch members $a^{10}\ a^{11}\ a^{14}$, $b^{10}\ b^{11}\ b^{14}$, $c^{10}\ c^{11}\ c^{14}$, $d^{10}\ d^{11}\ d^{14}$, $e^{10}\ e^{11}\ e^{14}$ may be operated by any suitable means, and in order that the construction and operation of my invention may be entirely clear I have shown at Figs. 2, 3, 4, and 5 suitable means for actuating the switch members $a^{10}\ a^{11}\ a^{14}$, $c^{10}\ c^{11}\ c^{14}$, $d^{10}\ d^{11}\ d^{14}$. As best seen at Fig. 5, the switch members of each station, as the one A', and the actuating means for said members are preferably supported by the inclosing case or box, as the one $a^{27}$, for supporting the usual signal and magneto-electric machine of the telephone set at said station. The switch members $a^{10}\ a^{11}$ are insulated from each other and preferably rock independently and reversely on a shaft $a^{28}$, projecting from the inner face of the front wall of the case $a^{27}$, as best seen at Fig. 5. Suitable springs $a^{29}\ a^{30}$, formed of electric conducting material, hold the switch members $a^{10}\ a^{11}$ in their normal position and connect the same to the conductors $a^{18}\ a^{21}$, and a stop $a^{31}$, of insulating material, limits their movement when rocked by said springs.

The switch members $a^{10}\ a^{11}$ are provided with apertures $a^{32}$, arranged out of alinement with each other, and suitable operating-pieces $a^{34}$, usually formed with pointed ends, are reciprocally movable into said apertures for alining the same and rocking the switch members $a^{10}\ a^{11}$ into position to control the direction and polarity of the current passed to one or both of the line-wires by the magneto-electric machine $a'$. The operating-piece corresponding to the station required is held in position by the operator's finger during the operation of the magneto-electric machine $a'$, and when said station has been called the pressure is relieved from said operating-piece, which is then automatically returned to its normal position by suitable means, as a spring $a^{34}$, whereupon the switch members $a^{10}\ a^{11}$ are also automatically returned to their normal position by the springs $a^{29}\ a^{30}$.

The switch member $a^{14}$ is preferably mounted on a suitable spindle projecting from the inner face of the rear wall of the case or box $a^{27}$, as best seen at Fig. 5, and is connected to a lever $a^{35}$, having one end mounted on the spindle for said switch member, and its opposite end extended through an opening in the adjacent side wall of the case $a^{27}$ and provided with a hook-shaped extremity $a^{36}$. The receiver $a^2$ is normally engaged with the extremity $a^{36}$ and depresses the lever $a^{35}$ against the action of a spring $a^{37}$. When the receiver $a^2$ is removed, the spring $a^{37}$ elevates the lever $a^{35}$, and thereby rocks the switch member $a^{14}$ from its normal position for completing the local circuit from the battery $a^5$ and the circuit to the line conductor from the secondary winding of the induction-coil $a^4$. As is apparent, the inclosing case $a^{27}$ is particularly applicable for supporting the switching device of my improved system; but it is obvious that the same may be otherwise supported, if desired. The switching devices of the stations $b\ c\ d\ e$ are usually supported by the inclosing cases or boxes for their signals and magneto-electric machines, and at Fig. 3 I have shown the switching device for station C' as supported by the inclosing case $a^{27}$.

It is, however, thought unnecessary to further illustrate and describe the switching devices of the stations B' C' D' E', as said devices are clearly shown diagrammatically at Fig. 1 and as it will be evident to one skilled in the art that the desired operation of said switching devices is effected by the telephone-supporting levers and the position of the apertures in the reversely-rocking switch members of said devices.

In order that my improved system may be thoroughly understood, I will now proceed to describe its operation.

As will be clearly pointed out in tracing the circuits, the signals $b$ $e$ are connected in metallic circuit to both line conductors, the signals $c$ $d$ are connected to the line conductor $A^{20}$ and to the ground, and, as previously stated, the signals $b'$ $c$ are operated by currents of negative polarity and the signals $d$ $e$ by currents of opposite polarity. If the attendant at station A' desires to actuate the negative signal $b$, he forces inwardly the operating-piece $a^{33}$ corresponding to said station, and thereby moves the switch member $a^{10}$ a sufficient distance to disengage the terminal $a^{12}$ from the terminal $a^9$ without disengaging the same from the terminal $a^8$. A negative current is then free to pass from the source of electric energy $a'$ to the signal $b$. The circuit for said current consists of the negative conductor $a^{21}$, switch member $a^{10}$, terminals $a^{12} a^8$, line conductor A, branch conductor $B^2$, terminals $b^8$ $b^{12}$ $b^9$, conductor $b^{20}$, switch member $b^{14}$, conductor $b^{19}$, negative signal $b$, conductor $b^{18}$, terminals $b^{13} b^{26}$, branch conductor $B^3$, line conductor A, terminals $e^6$ $e^{13}$, conductor $e^{18}$, positive signal $e$, (not operated by said current,) conductor $e^{19}$, switch member $e^{14}$, conductor $e^{20}$, terminals $e^9$ $e^{12}$ $e^8$, line conductor $A^{20}$, branch conductor $D^3$, terminals $d^8$ $d^{12}$ $d^{26}$, branch conductor $D^2$, line conductor $A^{20}$, branch conductor $C^3$, terminals $c^{26}$ $c^{12}$ $c^8$, branch conductor $C^2$, line conductor $A^{20}$, terminals $a^6$ $a^{13}$, conductor $a^{18}$, signal $a$, conductor $a^{19}$, switch member $a^{14}$, and positive conductor $a^{22}$ to the source of electric energy $a'$. When the attendant at station A' desires to operate the signal $e$, the corresponding operating-piece $a^{33}$ is actuated to reverse the position of the terminals $a^{12} a^{13}$, and consequently a positive current is then passed over the line conductor A from the terminal $a^{13}$ and returns over the line conductor $A^{20}$ to the terminal $a^{12}$. The circuit between the source of electric energy $a'$ and the signal $e$ is identical with that previously pointed out, and it will be understood that the passing current is incapable of operating the signal $b$. If the attendant at station A' wishes to operate the signal $c$, the corresponding operating-piece $a^{33}$ is actuated for respectively engaging the terminals $a^{12}$ $a^{13}$ with the terminals $a^6 a^7$, whereupon a negative current is passed over the line conductor $A^{20}$ through the stations C' D' to the ground and serves to operate the negative signal $c$. The circuit between said stations A' C' D' is as follows: from the ground along the conductor $a^{15}$, terminals $a^7 a^{13}$, conductor $a^{18}$, positive signal $a$, conductor $a^{19}$, switch members $a^{14}$, positive conductor $a^{22}$, source of electric energy $a'$, negative conductor $a^{21}$, switch member $a^{10}$, terminals $a^{12}$ $a^6$, line conductor $A^{20}$, branch conductor $C^2$, terminals $c^8$ $c^{12}$ $c^9$, conductor $c^{20}$, switch member $c^{14}$, conductor $c^{19}$, negative signal $c$, conductor $c^{18}$, terminals $c^{13}$ $c^7$, and conductor $c^{15}$ to the ground at station C'. A portion of the current passes from the terminal $c^{12}$ along the terminal $c^{26}$, branch conductor $C^3$, line conductor $A^{20}$, branch conductor $D^2$, terminals $d^{26} d^{12} d^9$, conductor $d^{20}$, switch member $d^{14}$, conductor $d^{19}$, positive signal $d$, conductor $d^{18}$, terminals $d^{13} d^7$, and conductor $d^{15}$ to the ground at station D'. Said portion of the current is, however, unable to actuate the positive signal $d$. In order to actuate the signal $d$ and call the station D', the corresponding operating-piece $a^{33}$ reverses the position of the terminals $a^{12}$ $A^{13}$, so that the terminals $a^{12}$ $a^{13}$ are respectively engaged with the terminals $a^7$ $a^6$. A positive current then flows over the same circuit, previously pointed out for the passage of the negative current for actuating the signal $c$, and said positive current actuates the signal $d$ without operating the signal $c$. The attendant or subscriber at any of the stations B' C' D' E' is also, preferably, able to call any other station, and in order that this operation may be apparent we will suppose that the station D' desires to successively actuate the signals $a$ $b$ $c$ $e$ and that the corresponding operating-pieces $d^{33}$ are successively operated to bring about the desired action of the switching device at said station D'. As clearly seen at Fig. 1, the terminals $d^{12}$ $d^{13}$ are respectively connected by the switch member $d^{10}$ and the conductor $d^{18}$, signal $d$, conductor $d^{19}$, and switch member $d^{14}$ to the negative and positive conductors $d^{21} d^{22}$, leading from the source of electric energy $d'$. When the positive signal $a$, which is normally in circuit with the line conductors A $A^{20}$, is to be operated, said terminals $d^{13}$ $d^{12}$ are respectively engaged with the terminal $d^6$ and the adjacent arm of the terminal $d^{26}$. A positive current is then passed from the movable terminal $d^{13}$ over the branch conductor $D^{20}$ and the line conductor A to the signal $a$ and is returned along the line conductor $A^{20}$, the branch conductor $D^2$, and the terminal $d^{26}$ to the movable terminal $d^{12}$. During this engagement of the terminals $d^{12} d^{13}$ the terminal $d^8$ is disconnected from the terminal $d^{12}$, and consequently no current is passed to the station E', which is at the opposite side of the station D'. The positive current for operating the signal $a$ also passes through the signal $b$, but is incapable of actuating the same.

When the negative signal $b$ is to be operated, the position of the terminals $d^{12} d^{13}$ is reversed, and a negative current passes to said signal $b$ and to the signal $a$ over the intervening portions of the line conductors A $A^{20}$, and said current is cut off from passage to the station E' at the opposite side of the station D'. In operating the signal $e$ the terminal $d^{13}$ is engaged with the terminal $d^6$, and the terminal $d^{12}$ is disconnected from the terminal $d^{26}$ without disengaging the same from the terminal $d^8$. A positive current then passes from the terminals $d^{13}$ $d^6$ along the branch conductor $D^{20}$ and the line conductor A to the signal $e$ and returns along the line and branch conductors $A^{20}$ $D^3$ to the terminals $d^8$ $d^{12}$. It will be understood, however, that as the terminal $d^{26}$ is disconnected from the terminal $d^{12}$ there is no liability of the passage of the current toward the stations A' B' on the opposite side of the station D'. When the signal $c$ is operated, the terminal $d^{13}$ is engaged with the grounded terminal $d^7$, and the terminal $d^{12}$ is disconnected from the terminal $d^8$ and is engaged with one arm of the terminal $d^{26}$, whereupon a negative current passes from the terminals $d^{12}$ $d^{26}$ along the branch conductor $D^2$, line conductor $A^{20}$, branch conductor $C^3$, terminal $c^{26}$, and terminal $c^{12}$ to the negative signal $c$ and thence to the ground.

The switching devices at the stations B' C' E' operate in substantially the same manner as the similar devices at the stations A' D', and it is thought unnecessary to fully set forth their operation. It will be particularly understood, however, that the switching device at the station B', when controlling the passage of the positive current to the station E', operates to break one of the line conductors connected to the station A', on the opposite side thereof, in the same manner as the switching device at the station D' operates to break one of said line conductors.

The electric communicating devices of the various stations A' B' C' D' E' are so arranged that the electrical communication takes place over a metallic circuit consisting of both line conductors. As clearly seen at Fig. 1 and previously pointed out, corresponding conductors, as $a^{16}$ $b^{16}$ $c^{16}$ $d^{16}$ $e^{16}$ of the telephones $a^2$ $b^2$ $c^2$ $d^2$ $e^2$, are connected either to a line conductor or to a branch conductor leading from said line conductor, and the opposite conductors leading from said telephones are connected by the switch members $a^{14}$ $b^{14}$ $c^{14}$ $d^{14}$ $e^{14}$ when moved from their normal position and the conductors $a^{17}$ $b^{17}$ $c^{17}$ $d^{17}$ $e^{17}$ to the opposite line conductor or branch conductors leading from said line conductor.

It will be apparent that by my system a metallic-circuit party-line is produced, which is differentiated from the prior art and from a pending application in favor of George W. Hey, in that by said system a metallic-circuit party-line is provided in which is placed one or more stations B' E', each having responsive devices, and one or more stations C' D', each having a ground-tap and a responsive device therein, and that a source of electrical energy $a'$, with an optional ground-tap, is placed in the branch of the metallic circuit which connects the junction points of the ground-taps of the stations C' D' and includes the station or stations B' E' which have their responsive devices in the metallic circuit. Should there be more than two stations which have their responsive devices in ground-taps, then the source of electrical energy $a'$, with its optional ground-tap, is placed in the branch of the metallic circuit which connects the junction-points of the first and last ground-taps and includes the station or stations B' E' which have their responsive devices in the metallic circuit. From this arrangement of the circuit and its parts it will be seen that the path of the current is controlled to operate the responsive devices either in the metallic circuit or in the ground-taps in the manner shown and described without the necessity of employing resistance devices in the ground-taps to prevent the current from short-circuiting to earth over both branches of the line, as would be the case where the source of energy is placed in the branch of the metallic circuit joining the ground-taps and excluding the responsive device in the metallic circuit, in which case the responsive devices in the metallic circuit would be short-circuited by the ground-taps unless these taps contained additional and high-resistance devices or as would be the case if the source of electrical energy were placed immediately between two of the stations having their responsive devices in the metallic circuit, in which case it would be impossible to actuate the responsive device in the metallic circuit without at the same time actuating one of the responsive devices in one of the two ground-taps. In other words, the use of all auxiliary devices to control the path of the current is dispensed with by arranging the source of energy with relation to the circuit and its parts, as herein set forth. The arrangement of the stations, responsive devices, and source of electrical energy just described is applicable not only for a private party-line, but also for use as a party-line in connection with a telephonic exchange, in which case the central office is substituted for one of the substations.

My improved system is preferably of the described construction, in order that each station may be capable of calling any other station; but it is obvious that, if desired, one station only may be capable of such operation. It is also obvious that one of the stations of my improved system may be dispensed with, and that, as hereinbefore mentioned, a central or telephonic-exchange station may be substituted therefor, which is also connected to a number of similar or other circuits leading thereto, as shown in my pending application, Serial No. 587,955.

The operation of my invention will now be readily understood upon reference to the foregoing description and accompanying drawings, and it will be particularly understood that I do not herein limit myself to the exact detail construction and arrangement of the switching or electric communicating devices, as the same may be somewhat varied without departing from the spirit of my invention.

Having thus fully described my invention, what I claim as new, and desire to secure by Letters Patent, is—

1. A party-line system comprising a metallic circuit, one or more stations having responsive devices in the metallic circuit, two or more stations each having a ground-tap and a responsive device therein, a source of electrical energy with an optional ground-tap, placeable in that branch of the metallic circuit which connects the junction-points of the first and last ground-taps and includes the responsive device of the station or stations first specified, and telephonic devices at each station placeable in the metallic circuit.

2. A party-line system comprising a metallic circuit, two or more stations having responsive devices in the metallic circuit, two or more stations each having a ground-tap and a responsive device therein, a source of electrical energy with an optional ground-tap, placeable in the metallic circuit between either station in the metallic circuit and the ground-tap adjacent thereto, and telephonic devices at each station placeable in the metallic circuit.

3. A party-line system comprising a metallic circuit, two or more stations each having responsive devices in the metallic circuit, one or more stations having a ground-tap and a responsive device therein, a source of electrical energy with an optional ground-tap placeable in the metallic circuit between the ground-tap having a responsive device therein and either station in the metallic circuit adjacent thereto, and telephonic devices at each station placeable in the metallic circuit.

4. A system for electrical communication comprising two line conductors, separate stations provided with signals operated by currents of different polarity and connected to the ground and to one line conductor, additional stations provided with signals operated by currents of different polarity and connected in metallic circuit to both line conductors, means for passing electric currents of different polarity over one line conductor to the stations connected thereto and to the ground and for passing currents of different polarity over both line conductors to the additional stations, means at said stations for operating the signals of any of the stations, and switching devices at said stations for controlling the passage and the polarity of the current, substantially as and for the purpose specified.

5. The combination with fixed terminals connected to conductors for the passage of an electric current; of independently-movable switch members provided with terminals for engaging the former terminals and regulating the passage of the current, and an operating-piece mechanically connected to each of said switch members for simultaneously actuating the same, substantially as described.

6. The combination with fixed terminals connected to conductors for the passage of an electric current; of independently-movable switch members provided with terminals for engaging the former terminals and regulating the passage of the current, and a plurality of operating-pieces each connected to each of said switch members for independently actuating the same, substantially as and for the purpose specified.

7. The combination with fixed terminals connected to conductors for the passage of an electric current; of independently-movable switch members provided with terminals for engaging the former terminals and regulating the passage of the current, an electrically-operated device normally connected to one of said movable switch members, and a plurality of operating-pieces each connected to each of said switch members for independently actuating the same, substantially as and for the purpose described.

8. The combination with fixed terminals connected to conductors for the passage of an electric current; of independently-movable switch members provided with terminals for engaging the former terminals and regulating the passage of the current, a source of electric energy normally connected to said movable switch members, and a plurality of operating-pieces each connected to each of said switch members for independently actuating the same, substantially as and for the purpose set forth.

9. The combination with a circuit having signals or responsive devices connected thereto, a generator; and terminals connected to the circuit; of switch members movable independently in opposite directions and provided with terminals connected to the poles of the generator and movable into engagement with the former terminals for regulating the passage of the current from the generator to the circuit, and an operating-piece for moving one switch member in one direction and engaging its terminal with one of the former terminals, and for moving the other switch member in the opposite direction and engaging its terminal with another of the former terminals during the engagement of the terminal on the first switch member with said one of the former terminals engaged therewith, substantially as and for the purpose described.

10. The combination with a circuit having signals or responsive devices connected thereto, a generator, and terminals connected to the circuit; of independently-movable switch members provided with terminals connected to the poles of the generator and movable into engagement with the former terminals for regulating the passage of the current from the generator to the circuit, and an operating-piece for moving one switch member in one direction and engaging its terminal with one of the former terminals, and for moving the other switch member a less distance than the first switch member and engaging its terminal with another of the former terminals during the engagement of the terminal on the first switch member with said one of the former terminals engaged therewith, substantially as and for the purpose set forth.

11. The combination with fixed terminals connected to conductors for the passage of an electric current; of independently-movable switch members provided with movable terminals for engaging the former terminals and regulating the passage of the current, a plurality of operating-pieces each connected to said switch members for independently actuating the same, local conductors connected to the former conductors, an electric communicating device, an additional switch member for connecting said device to the local conductors, and a support for the electric communicating device connected to the additional switch member for operating the same, substantially as and for the purpose set forth.

12. The combination with fixed terminals connected to conductors for the passage of an electric current; of independently-movable switch members provided with terminals for engaging the former terminals and regulating the passage of the current, said switch members being formed with apertures arranged out of alinement with each other, and operating-pieces movable into the apertures for actuating said switch members, substantially as and for the purpose described.

13. The combination with fixed terminals connected to conductors for the passage of an electric current; of independently-movable switch members provided with terminals for engaging the former terminals and regulating the passage of the current, said switch members being provided with apertures arranged out of alinement with each other, operating-pieces movable into the apertures for actuating said switch members, and springs for returning said switch members to their normal position, substantially as and for the purpose set forth.

14. The combination with fixed terminals connected to conductors for the passage of an electric current; of independently-movable members provided with terminals for engaging the former terminals and regulating the passage of the current, said members being provided with apertures arranged out of alinement with each other, operating-pieces movable into the apertures for actuating said members, and means for holding said members in their normal position, substantially as and for the purpose specified.

15. The combination with fixed terminals connected to conductors for the passage of an electric current; of reversely-rocking switch members provided with terminals for engaging the former terminals and regulating the passage of the current, said switch members being provided with apertures arranged out of alinement with each other, and reciprocating operating-pieces movable into the apertures for actuating said switch members, substantially as and for the purpose described.

16. The combination with a circuit having signals or responsive devices connected thereto, a generator, and terminals connected to the circuit; of movable switch members provided with terminals connected to the poles of the generator and movable into engagement with the former terminals for regulating the passage of the current from the generator to the circuit, and an operating-piece movable in a plane disposed at an angle with the plane of movement of the switch members, for moving said switch members and engaging their terminals with the former terminals, substantially as and for the purpose set forth.

17. The combination of a subscriber's circuit having responsive devices connected thereto, a generator, a switch, said switch being provided with terminals connected to the circuit, independently-movable switch members provided with terminals connected to the poles of the generator and movable into engagement with the former terminals, a plurality of operating-pieces suitably connected to the switch members for actuating the same, and means for automatically returning the switch members to their normal position, substantially as and for the purpose set forth.

In testimony whereof I have hereunto signed my name, in the presence of two attesting witnesses, at Syracuse, in the county of Onondaga, in the State of New York, this 7th day of April, 1896.

ALEXANDER T. BROWN.

Witnesses:
  E. A. WEISBURG,
  K. H. THEOBALD.